No. 887,077. PATENTED MAY 12, 1908.
F. L. DYE.
SLEET CUTTER AND SCRAPER.
APPLICATION FILED JAN. 28, 1908.

Witnesses.
Fordyce W. Brown.
John A. Boyce

Inventor.
Frank L. Dye.
By Atty N. DuBois.

UNITED STATES PATENT OFFICE.

FRANK L. DYE, OF SPRINGFIELD, ILLINOIS.

SLEET CUTTER AND SCRAPER.

No. 887,077.     Specification of Letters Patent.     Patented May 12, 1908.

Application filed January 28, 1908. Serial No. 413,111.

*To all whom it may concern:*

Be it known that I, FRANK L. DYE, a citizen of the United States, residing at Springfield, in the county of Sangamon and State of Illinois, have invented a certain new and useful Sleet Cutter and Scraper, of which the following is such a full, clear, and exact description as will enable others skilled in the art to which it appertains to make and use my said invention.

This invention relates to sleet cutters and scrapers for cutting the sleet on trolley wires of electric lines and removing it therefrom in advance of the trolley wheels running on said wires.

The purposes of this invention are to provide a cutter wheel and a scraper mounted on an oscillative frame so that said wheel and scraper will be self-adjusting on the wire; to provide means for fixing the cutter and scraper frame in different positions; to provide means so that the cutter and scraper device may be run in electrical connection with the trolley or may be insulated therefrom; to provide a spring-holding device and means for adjusting the tension thereof to hold the cutter wheel and scraper in contact with the trolley wire without exerting undue pressure thereon; to provide guards to prevent the mechanism from catching on stay wires, in case the trolley is displaced; to provide means connecting the cutter and scraper frame with the trolley pole so that the parts may be easily detached and replaced in case of breakage; and to provide a swivel connection of the cutter and scraper frame with the trolley pole, so that the cutter wheel and scraper will not run off the wire when going around curves.

With these ends in view, my invention consists in the novel features of construction and combinations of parts shown in the annexed drawings to which reference is hereby made, and hereinafter particularly described, and finally recited in the claims.

Figure 1:
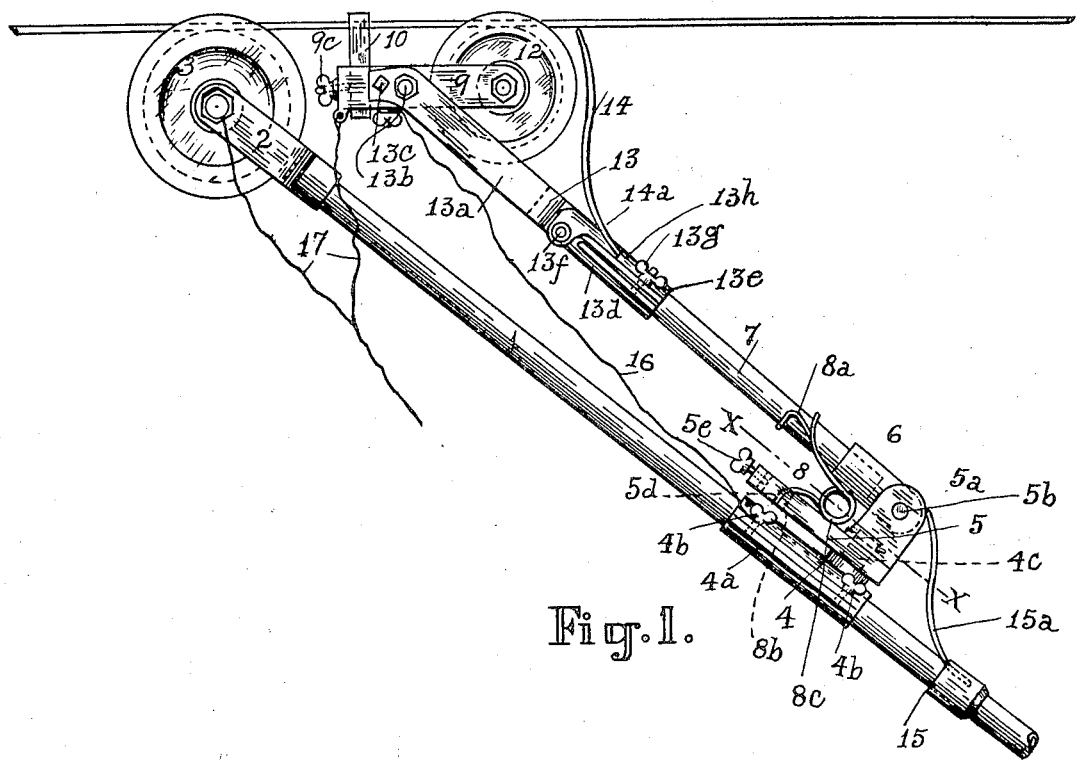
Figure 2:
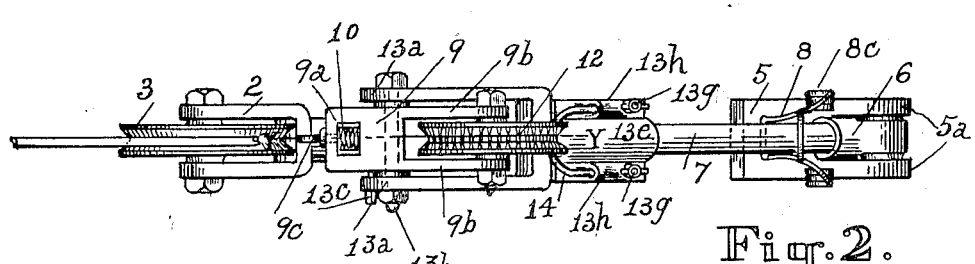
Figure 4:
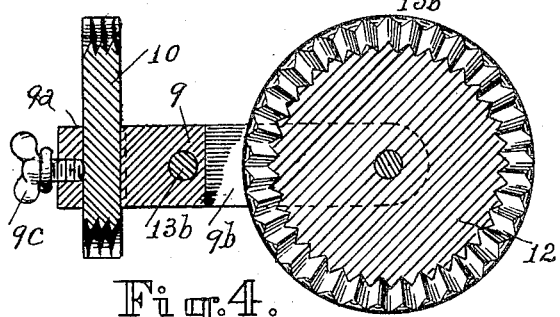
Figure 3:
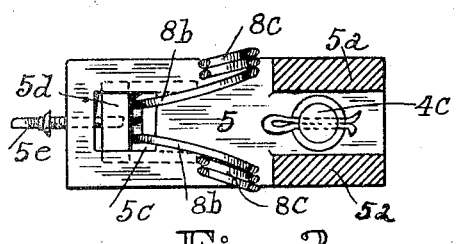

Referring to the drawings, Figures 1 and 2 are respectively a side elevation and top plan of the complete device. Fig. 3 is an enlarged partial, longitudinal section on the line X X of Fig. 1, and Fig. 4 is an enlarged partial longitudinal section on the line Y Y of Fig. 2.

Similar reference numerals and characters designate like parts in the several views.

The trolley pole 1, the harp 2 and the trolley wheel 3 are all of the usual well known construction. The swivel block consists of two semi-tubular flanged members 4 and $4^a$ surrounding the trolley pole 1 and secured together by screws $4^b$. The member 4 has a stud $4^c$ on which the swivel frame turns. The swivel frame 5 has upwardly extending forked members $5^a$ accommodating the socket block 6. A bolt $5^b$ extends through the forked members $5^a$ and the block 6 and the block turns on the bolt. The block 6 has a longitudinal socket in which a pole 7 of insulating material, preferably wood, fits. The frame 5 has an opening $5^c$ accommodating a longitudinally sliding block $5^d$. A screw $5^e$ extends through the end of the frame 5 and acts on the block $5^d$ to move the block lengthwise of the opening in the frame.

A spring 8 rests on top of the frame 5 and has an upwardly curved member $8^a$ shaped to fit around the under side of the pole 7; members $8^b$ extending downwardly into the opening $5^c$ and acted against by the blocks $5^d$; and coiled members $8^c$, one on each side of the block 6, so situated that the block may turn downward between the coiled members. By turning the screw $5^e$ to the right, the block $5^d$ may be caused to press against the downwardly extending spring members to increase the tension of the spring, and reverse turning of the screw will relax the tension of the spring.

The cutte rand scraper frame 9 has a vertical opening $9^a$ accommodating the scraper 10 and has forked members $9^b$ between which the cutter wheel 12 turns. A screw $9^c$ extending through the end of the frame 9 bears against the double scraper 10 and secures it in any desired position in the opening $9^a$. The frame 9 fits between the forked members $13^a$ of the harp 13. A bolt $13^b$ extends through the harp members $13^a$ and the block 9 and pivotally connects the frame 9 with the harp 13. A set screw $13^c$ extends through one member $13^a$ and the inner end of the screw bears against the frame 9 to hold the frame in any desired position relative to the harp 13. Usually the frame 9 will be free to oscillate on the harp 13; but in case exceptionally hard service is required the frame 9 may be adjusted so that both the wheel 12 and the scraper 10 will bear firmly against the under side of the trolley wire and the frame 9 may then be secured by tightening the set screws 13$^c$ and the spring 8 may be caused to exercise the desired increased pressure by tightening the screw 5$^c$ to increase the tension of the spring. The harp 13 has an integral semi-tubular flanged member 13$^d$ fitting around the under side of the pole 7. A semi-tubular flanged member 13$^e$ is connected with the member 13$^d$ by a hinge 13$^f$. Bolts 13$^g$ connect the members 13$^d$ and 13$^e$ so that when the pole 7 is in place between the members and the nuts on the bolts are tightened, the pole will be firmly held between the members.

In case of breakage of the parts the bolts 13$^g$ may be loosened so that the parts may be easily separated and the broken parts replaced.

An approximately U-shaped guard 14 has downwardly extending members 14$^a$ which fit in sockets 13$^h$, one on each side of the member 13$^e$.

A collar 15 is suitably secured on the trolley pole 1 and a curved guard 15$^a$ is secured on the collar 15 and extends upwardly to the upper ends of the forked members 5$^a$. In case of displacement of the cutter 12 and scraper 10 and the consequent sudden lifting of the pole 7 and connected parts, the guards 14 and 15$^a$ prevent the stay wires connected with the trolley wire from catching under the wheel 12 or against the lower end of the swivel block or the swivel frame; and by this means injury either to the stay wires or the cutter and scraper mechanism is avoided.

Ordinarily it is preferable that the cutter and scraper frame shall have an insulated connection with the trolley pole in order that the action of the cutter wheel 12 and the scraper 10 may be purely mechanical and also in order to prevent the burning of the cutter wheel and scraper, which might occur if the cutter wheel and scraper frame were electrically connected with the trolley pole. There are however conditions under which an electrical connection may be desirable. I make this connection by means of a wire 16 having one end connected with the swivel block 4 and the other end connected with the frame 9.

A rope 17 connected with a suitable retriever (not shown) is connected with the trolley harp 2 and the frame 9 so that the trolley harp and the frame 9 may be simultaneously moved in placing the wheels 3 and 12 on the wire or in removing them therefrom.

Having fully described my invention, what I claim as new and desire to secure by Letters Patent is 1. The combination of a trolley pole, a swivel block detachably connected with said trolley pole, a swivel frame mounted on said swivel block, a socket block pivotally connected with the said swivel block, a pole of insulating material supported on said socket block, a harp detachably connected with said insulating pole, a cutter and scraper frame mounted on said harp and a cutter device and a scraper device mounted on said cutter and scraper frame.

2. A pole of insulating material, cutter and scraper devices mounted on said pole, a trolley pole of conducting material and means for connecting said pole of insulating material with said trolley pole.

3. A pole of insulating material, a trolley pole, means for pivotally connecting said insulating pole with said trolley pole, a harp having semi-tubular members hinged together and adapted to inclose said pole of insulating material, means for securing together the hinged members of the harp, a cutter and scraper frame pivotally supported on said harp and equipped with a cutter and a scraper; and means for fixing said scraper and cutter frame on said harp.

4. The combination of a trolley pole, an insulating pole having a swivel and pivot connection with the trolley pole and cutter and scraper devices connected with said insulating pole.

5. The combination of a trolley pole, a swivel block secured on said trolley pole, a swivel frame mounted on said swivel block, an arm pivotally connected with the swivel frame, cutter and scraper devices connected with said arm, a spring supported on the swivel frame and acting to raise said arm; and means for adjusting the tension of said spring.

6. The combination of a trolley pole, a swivel frame mounted on the trolley pole, a guard connected with the trolley pole and guarding the end of the swivel frame, an insulating pole mounted on said swivel frame, a cutter wheel mounted on said insulating pole and a guard adjacent to and guarding said cutter wheel.

7. The combination of a trolley pole of conducting material, an insulating pole mounted on said trolley pole, a cutter and scraper frame of conducting material, supported on said insulating pole, a cutter wheel and a scraper mounted on said cutter and scraper frame; and a conductor detachably connected with said trolley and said cutter and scraper frame.

8. The combination of a trolley pole, an insulating pole mounted on the trolley pole, a cutter and scraper frame mounted on said insulating pole and equipped with a cutter device and a scraper device; and a cord connecting said cutter and scraper frame with said trolley pole.

9. The combination of a cutter and scraper frame provided with an opening adapted to accommodate a reversible scraper, a scraper fitting in the opening of said frame and having scraping surfaces at both ends; and a securing device adapted to secure said scraper in the opening of said frame.

In witness whereof I have hereunto subscribed my name at Springfield, Illinois this 7th day of December, 1907.

FRANK L. DYE.

Witnesses:
B. W. ARNOLD,
W. J. AURELIUS.